(12) United States Patent
Harris (10) Patent No.: US 8,438,123 B2
(45) Date of Patent: May 7, 2013

(54) METHOD AND APPARATUS FOR CONFIGURING A COMMUNICATION CHANNEL

(75) Inventor: Christopher Harris, Plymouth (GB)

(73) Assignee: University of Plymouth Enterprise Limited, Plymouth (GB)

( * ) Notice: Subject to any disclaimer, the term of this patent is extended or adjusted under 35 U.S.C. 154(b) by 1089 days.

(21) Appl. No.: 12/064,222

(22) PCT Filed: Aug. 17, 2006

(86) PCT No.: PCT/GB2006/003087
§ 371 (c)(1),
(2), (4) Date: Jul. 9, 2008

(87) PCT Pub. No.: WO2007/020452
PCT Pub. Date: Feb. 22, 2007

(65) Prior Publication Data
US 2009/0171874 A1    Jul. 2, 2009

(30) Foreign Application Priority Data

Aug. 19, 2005    (GB) .................................. 0517046.9
Aug. 7, 2006    (GB) .................................. 0615643.4

(51) Int. Cl.
*G06F 15/18* (2006.01)

(52) U.S. Cl.
USPC ............................................ 706/23; 706/27

(58) Field of Classification Search ............ 706/23, 706/27
See application file for complete search history.

(56) References Cited

U.S. PATENT DOCUMENTS

| | | | |
|---|---|---|---|
| 4,987,897 A | 1/1991 | Funke |
| 5,781,648 A | 7/1998 | Sarpeshkar et al. |
| 5,822,742 A | 10/1998 | Alkon et al. |
| 6,603,734 B1 | 8/2003 | Oksanen |
| 6,691,073 B1 | 2/2004 | Erten et al. |
| 2004/0178934 A1 | 9/2004 | Balakrishnan et al. |

FOREIGN PATENT DOCUMENTS

| | | |
|---|---|---|
| EP | 1 622 330 | 1/2006 |
| GB | 2 265 036 | 9/1993 |

OTHER PUBLICATIONS

Itti et al ("Revisiting spatial vision: toward a unifying model" Nov. 2000).*
Petrov et al ("The Dynamics of Perceptual Learning: An Incremental Reweighting Model" 2005).*
Christopher Harris ("Temporal uncertainty in reading the neural code (proportional noise)" 2002).*
Notification of the First Office Action—Chinese Patent Application No. 200680030107.4 dated Nov. 2, 2010.

(Continued)

*Primary Examiner* — Lut Wong
(74) *Attorney, Agent, or Firm* — Marshall, Gerstein & Borun LLP (57) ABSTRACT

A method of configuring a communication channel prior to the transmission of an input signal along the communication channel, the communication channel comprising a plurality of sub-channels, the method comprising determining the strength of the input signal and in accordance with the determined signal strength, selecting a set of the plurality of sub-channels and transmitting said input signal along the set of sub-channels in parallel, wherein each of the sub-channels has a predetermined noise characteristic such that the set of selected sub-channels exhibits a combined noise characteristic in which the standard deviation of the noise is proportional to the signal strength.

18 Claims, 7 Drawing Sheets

OTHER PUBLICATIONS

International Search Report and Written Opinion of the International Searching Authority for International Application No. PCT/GB2006/003087 dated Jan. 4, 2007.
Patents Act 1977: Search Report under Section 17 dated Sep. 20, 2006.
Communication pursuant to Article 94(3) EPC in EPO Appl. No. 06779159.0 dated Jun. 10, 2008.
Definition of "Directly Proportional" by the Free Online Dictionary, Internet page found at www.thefreedictionary.com/Directly+proportional, Copyright 2011, date captured Aug. 5, 2011, 2 pages.
"Building a Strong Foundation in Mathematics", Year 10 Interactive Maths—Second Edition, Internet page found at www.mathsteacher.com/au/year10/ch17_variation/05_directvariation/25direct.h, Copyright 2001-2011, date captured Aug. 5, 2011, 5 pages.
"How to Determine Whether Two Variables Are Directly Proportional", Internet page found at www.wikihow.com/Determine-Whether-Two-Variables-Are-Directly-Proportional, date captured Aug. 5, 2011, 3 pages.
"Signal Detection Theory in the 2AFC Paradigm: Attention, Channel Uncertainty and Probablitiy Summation", Tyler et al., Vision Research 40, 2000, pp. 3121-3144.

\* cited by examiner

METHOD AND APPARATUS FOR CONFIGURING A COMMUNICATION CHANNEL

BACKGROUND

1. Technical Field

The present application relates to a method and apparatus for configuring a communication channel prior to the transmission of a signal along the channel such that a desired noise characteristic of the channel is achieved.

2. Related Technology

Within the human body a great number of electrical signals are being constantly transmitted over an equally great number of communication channels in the form of signals being passed, for example, between the brain and the various muscles of the body. For example, to move ones arm requires a number of signals to be sent from the brain to the various muscles via various neurological channels. As in most communication channels, those within the body introduce a certain amount of noise to the transmitted signal. It has been found that the noise characteristics of the neurological channels within the human body result in the introduced noise being "proportional noise" (sometimes referred to as multiplicative noise or scalar noise), by which it is meant that the standard deviation of the noise is proportional to the signal strength. This is markedly different to conventional engineered communications systems in which either a) the noise is assumed to be additive and independent of the underlying signal, or b) the noise has a Poisson (or Renewal) distribution in which the standard deviation is proportional to the square root of the signal strength.

As increasing endeavours are made to artificially simulate the neurological behaviour of the human body, for example in the fields of artificial intelligence using neural networks and prosthetic limbs that are actuated by the patient's own neurological systems, the behaviour of the chosen communication channel in such simulated systems is of an increasing importance. The identification by the current applicant that the current communication channels within the human body follow a proportional noise model compared with a Poisson noise model that has previously been assumed in artificial systems introduces the desire to configure a communications channel to exhibit a noise characteristic substantially the same as that found to be exhibited in natural neurological systems.

SUMMARY

According to a first embodiment of the present invention there is provided a method of configuring a communication channel prior to the transmission of an input signal along the communication channel, the communication channel comprising a plurality of sub-channels, the method comprising determining the strength of the input signal and in accordance with the determined signal strength, selecting a set of the plurality of sub-channels and transmitting said input signal along the set of sub-channels in parallel, wherein each of the sub-channels has a predetermined noise characteristic such that the set of selected sub-channels exhibits a combined noise characteristic in which the standard deviation of the noise is proportional to the signal strength.

Each sub-channel is preferably selected only if the instantaneous input signal strength exceeds an individual threshold value associated with each sub-channel.

The noise characteristic of each sub-channel is preferably defined by a gain function associated with each sub-channel and a constant weighting value $w_i$ applied to the output of each sub-channel.

Additionally, the distribution of the weighting values $w(x)$ and the distribution of sub-channels having a threshold value equal to the instantaneous signal strength $\rho(x)$ may be derived from equations relating $w(x)$, $\rho(x)$, the gain and noise function and variance of the sub-channels. The equations may be solved by numerical methods.

In some embodiments, the input signal may have a minimum instantaneous value $\epsilon$ and the total number N of sub-channels may be determined from an equation relating N, $\epsilon$, and $\rho(x)$.

According to a further aspect of the present invention there is provided apparatus for configuring a communication channel comprising a plurality of sub-channels, each sub-channel having a threshold switch arranged to receive an input signal having an instantaneous signal value and to connect the sub-channel to the input signal only if the instantaneous signal value exceeds a predetermined threshold value, the apparatus further comprising a summator arranged to receive the output of each sub-channel and combine said outputs to provided a combined output signal, wherein each sub-channel has a predetermined noise characteristic such that the connected sub-channels exhibit a combined noise characteristic in which the standard deviation of the noise is proportional to the signal strength.

Preferably each sub-channel may include a constant gain unit arranged to apply a constant weighting value $w_i$ to the output of each sub-channel prior to the output being provided to the summator and each sub-channel may have a further gain function associated with it, such that the noise characteristic of each sub-channel is defined by said gain function and said constant weighting value $w_i$.

BRIEF DESCRIPTION OF THE DRAWINGS

Embodiments of the present invention are described below, by way of illustrative example only, with reference to the accompanying figures, of which.

DETAILED DESCRIPTION

Figure 1:
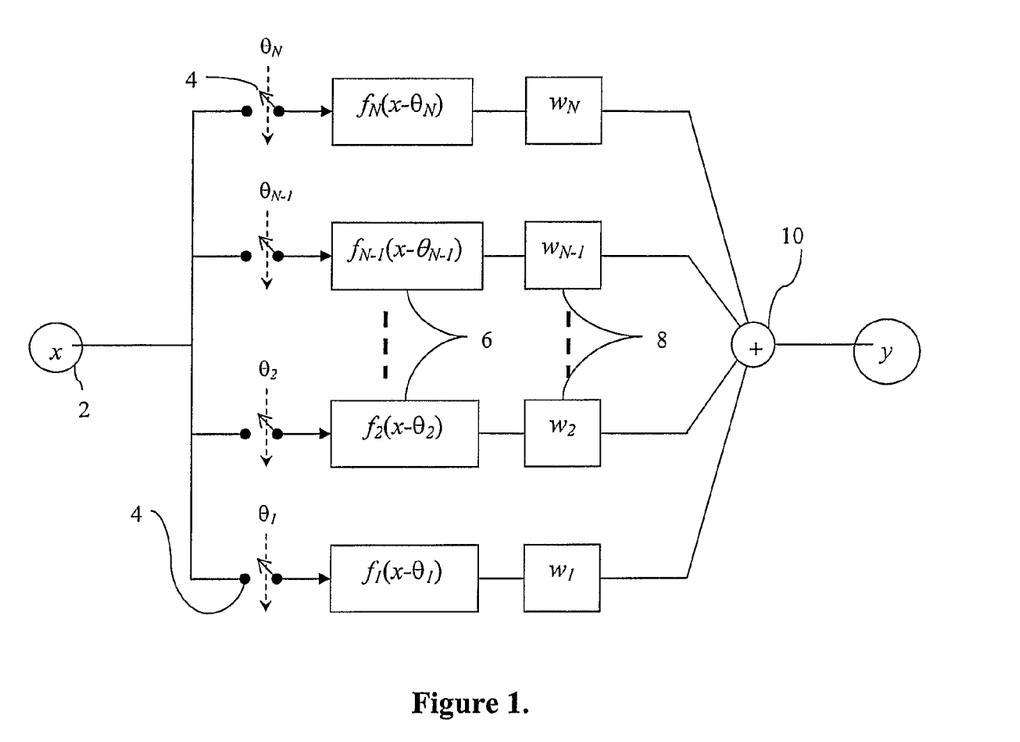
FIG. 1 schematically illustrates a plurality of communication channels configured according to embodiments of the present invention.

With reference to FIG. 1, an input signal source 2 is connected to N threshold switches 4 (N being a positive integer number) connected in parallel. Each threshold switch 4 is arranged to be activated only if the instantaneous value of the input signal exceeds a predetermined threshold level $\theta_i$, where i=1 to N (i.e. the threshold level for each threshold switch 4 is individually set). When activated, each threshold switch 4 connects the input signal source to one of a plurality of communication sub-channels 6, each sub-channel having a gain function $f(x)$. The threshold switches may be implemented using operational amplifiers or transistors and appropriate reference voltages, although it will be appreciated by those skilled in the art that other appropriate thresholding techniques may be used. The output of each sub-channel is weighted by a constant weight w applied by means of a fixed gain unit 8 (such as a fixed gain amplifier) before being added together by a summator (or demultiplexor) 10 to provide a combined output signal y.

As mentioned above, the value of the input signal varies over time t and can thus be expressed as x(t) where $0 \leq x(t) \leq x_{max}$. Similarly, the output signal can be expressed as y(t), where $0 \leq y(t) \leq y_{max}$. The explicit dependence on time t will be dropped in the following explanation except for emphasis.

In embodiments of the present invention there are N sub-channels. The input and output of the ith sub-channel ($1 \leq i \leq N$) are non-negative and denoted by and $x_i$ and $y_i$ respectively. When a sub-channel is activated (or switched ON), the transfer of signal is given by the gain function:

$$y_i = f_i(x_i)$$

and the variance of the noise on the output is related to the input by the noise function:

$$\sigma_{y_i}^2 = g_i(x_i)$$

where f(.) and g(.) are monotonically increasing (or constant) functions for $x_i > 0$. When a sub-channel is not activated (or switched OFF) it transmits no signal and transmits no noise. That is f(.) and g(.) are zero for $x_i \leq 0$ (note that f(.) and g(.) may be step functions), such that:

$$y_i = \begin{bmatrix} f(x_i) & x_i > 0 \\ 0 & x_i \leq 0 \end{bmatrix}$$

The threshold applied by the threshold switch 4 for each sub-channel has a constant value $\theta_i(t) = \theta_i > 0$, such that the channel is activated when the input signal is greater than $\theta_i$ and switched off when the input is below or equal to $\theta_i$. Each sub-channel receives the same original input signal, so that;

$$y_i = f_i(x - \theta_i) \text{ and}$$

$$\sigma_{y_i}^2 = g_i(x - \theta_i)$$

The demultiplexor combines all the sub-channels by a weighted addition of their outputs with constant weights $w_i(t) = w_i$, so that the combined output signal is given by:

$$y(x) = \sum_{i=1}^{N} w_i f_i(x - \theta_i) \quad (1)$$

and the output noise variance is given by:

$$\sigma_y^2(x) = \sum_{i=1}^{N} w_i^2 g_i(x - \theta_i) \quad (2)$$

The relationship between the output signal, y(x), and the output variance $\sigma_y^2(x)$ is determined by the properties of the sub-channels $f_i(x)$, $g_i(x)$, and the choice of weights $w_i$ and thresholds $\theta_i$. For proportional noise it is required that $\sigma_y(x) = |y(x)|$.

For a large plurality of sub-channels, the weights and threshold can be found analytically. This can be illustrated with a unity gain system and shown that by suitable choices for f(.), g(.), $w_i$, and the $\theta_i$ it can be arranged so that, as N→∞, $$y \to x$$

and $$\sigma_y \to ky,$$

which is proportional noise with k being the constant of proportionality.

To show this, it is assumed that the number of channels is sufficiently large to replace summations by integration. Denote ρ(x) as the number of sub-channels with threshold θ=x (i.e. the number of sub-channels activated for any instantaneous value of x), $y_x$ as the output of each of these sub-channels and w(x) as the output weight of each of these sub-channels. Then from equations (1) and (2) it follows that:

$$y = x = \int_0^{x_{max}} w(x')\rho(x')y_x(x')dx' \quad (3)$$

and $$\sigma^2 = k^2 x^2 = \int_0^{x_{max}} w^2(x')\rho(x')y_x(x')dx' \quad (4)$$

Since it is required that $y_i$ and $\sigma_y$ are zero for $x \leq \theta_i$, equations (3) & (4) can be rewritten as convolution integrals:

$$y = x = \int_0^x w(x')\rho(x')f_x(x - x')dx' \quad (5)$$

$$\sigma_y^2 = k^2 x^2 = \int_0^x w^2(x')\rho(x')g_x(x - x')dx' \quad (6)$$

which are called the continuous 'recruitment equations' (see example 2 below).

Equations (5) and (6) can be solved in some circumstances for w(x) and ρ(x) given the functional forms of f(.) and g(.). In practical terms, the equations may best be solved using known numerical techniques.

The system thus described above is for positive input signals. For negative input signals a similar channel is used, wherein the signs of the input and output signals and thresholds levels are reversed. For bipolar input signals, two channels (each with its own sub-channels) are required, one for positive and the other for negative input signals.

The above methodology encompasses the present invention in a general case for all functional forms of f(.) and g(.). Depending on f(.) and g(.) there may be circumstances in which equations (5) and (6) are not solvable and thus values for w(x) and ρ(x) can not be determined. In examples 1 and 2 below the above general methodology of the present invention is applied to particular cases.

Example 1

The Simple Conductor Sub-Channel

Figure 2:
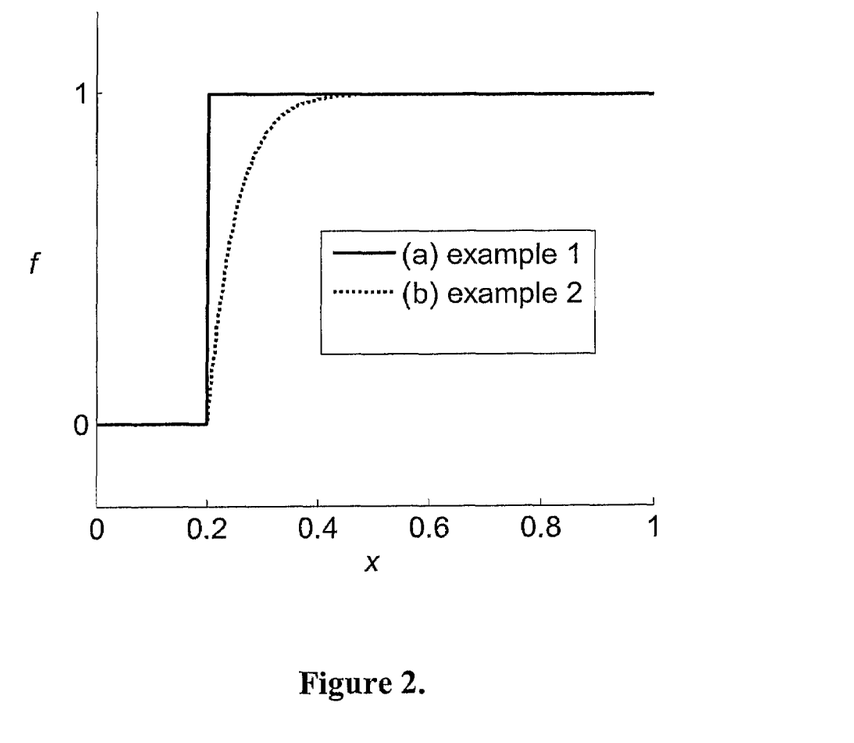
FIGS. 2a & 2b illustrates examples of sub-channel responses for embodiments of the present invention.
Figure 3:
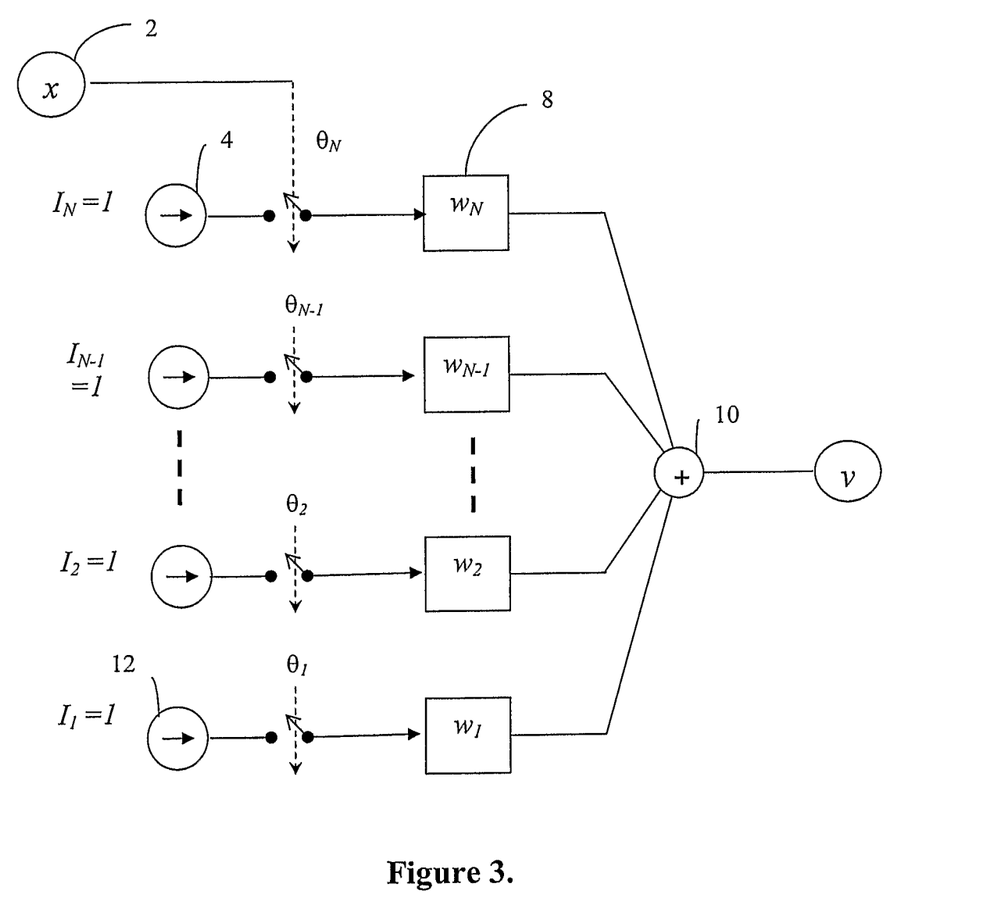
FIG. 3 schematically illustrates an arrangement of sub-channels having a step gain function according to an embodiment of the present invention.

In this, the simplest example, each sub-channel is either ON or OFF. Although the substance of a sub-channel is arbitrary, in this example each sub-channel is considered to be a single electrical conductor carrying either zero (I=0; OFF) or unit (I=1; ON) current. This is schematically illustrated in FIG. 3, which shows an arrangement similar to that shown in FIG. 1 with the exceptions that the input signal 2 is only provided to the threshold inputs of each of the threshold switches 4, which in turn have their inputs connected to unit current sources 12. Each sub-channel thus simply either passes unit current I (ON) when the input signal exceeds the threshold level or is switched off. Thus, the overall gain function is a step function, as illustrated in FIG. 2a.

The currents of all sub-channels are summed at the output with weights $w_i$ to yield the output current y. When a sub-channel is OFF, it generates no noise, and when ON it generates noise with standard deviation c. Sub-channel noises are assumed to be independent. Each sub channel has a threshold level, $\theta_i$. When the input signal, x, is below a sub-channel threshold, $x \leq \theta_i$, the sub-channel is OFF. When the input signal exceeds the threshold, $x > \theta_i$, the sub-channel is ON.

To find the weights and threshold density function required to generate Proportional Noise when there is a large number of sub-channels the response of each sub-channel is written as:

$$y_i = u(x - \theta_i)$$

where $$u(z) = \begin{bmatrix} 1 & z > 0 \\ 0 & z \leq 0, \end{bmatrix}$$

is the unit step function. The noise function is similarly:

$$\sigma_y^2 = c^2 u(x - \theta_i),$$

where c is a constant that is determined by the sub-channel noise. The output of a sub-channel does not change with increasing input, once it is switched on. Therefore, eq. 5 simplifies to:

$$y = x = \int_0^x w(x') \rho(x') dx', \quad (7)$$

which requires that $$w(x)\rho(x) = 1. \quad (8)$$

Eq. 6, becomes:

$$\sigma_y^2 = k^2 x^2 = \int_0^x c^2 w^2(x') \rho(x') dx'. \quad (9)$$

Substituting eq. 8 into eq. 9, yields:

$$w(x) = 2k^2 x/c^2, \quad (10)$$

and from the above expression for $\sigma_y^2$, the density distribution of thresholds is therefore:

$$\rho(x) = c^2/2k^2 x.$$

These distributions indicate that stronger (i.e. higher $w_i$) sub-channels need to be recruited at higher input signal strengths, and that there should be fewer of them than weaker sub-channels.

In practice it is not possible produce proportional noise down to x=0 because of the singularity in $\rho(x)$ in this embodiment. Therefore a lower bound of $x = \epsilon$ is applied to the input signal so that the range becomes $\epsilon \leq x \leq x_{max}$, where $\epsilon$ depends on the total number of sub-channels. Thus:

$$N = \int_\epsilon^{x_{max}} \rho(x) dx = c^2 \ln(x_{max}/\epsilon)/2k^2 \quad (11)$$

or $$k^2 = \frac{c^2}{2N} \ln(x_{max}/\epsilon). \quad (12)$$

There is therefore a trade-off between $\epsilon$, N, and the noise coefficients c, g, and k.

Figure 4:
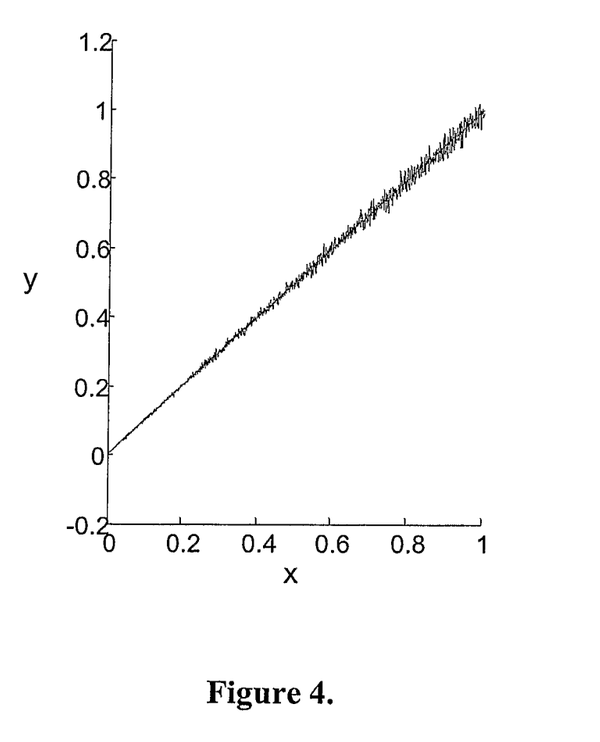
FIG. 4 illustrates the output of the communications channel shown in FIG. 3.
Figure 5:
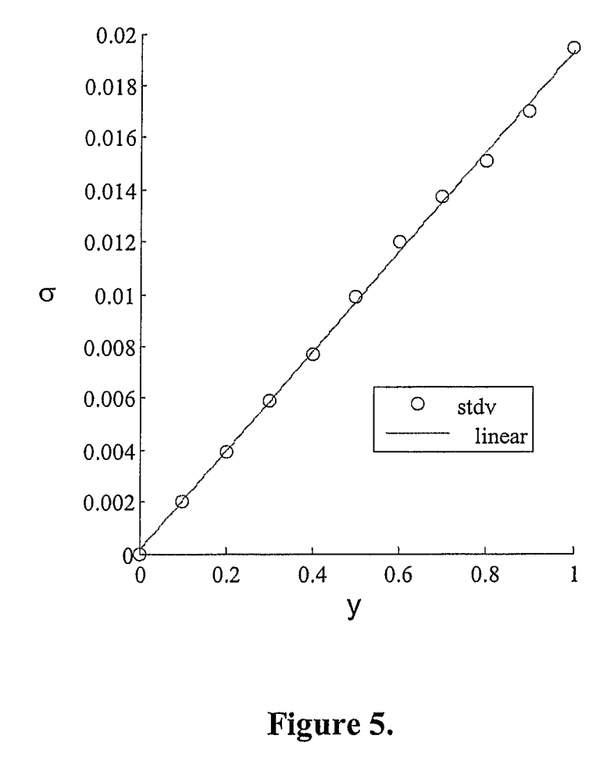
FIG. 5 illustrates the standard deviation of the noise of the communications channel of FIG. 3.
Figure 6:
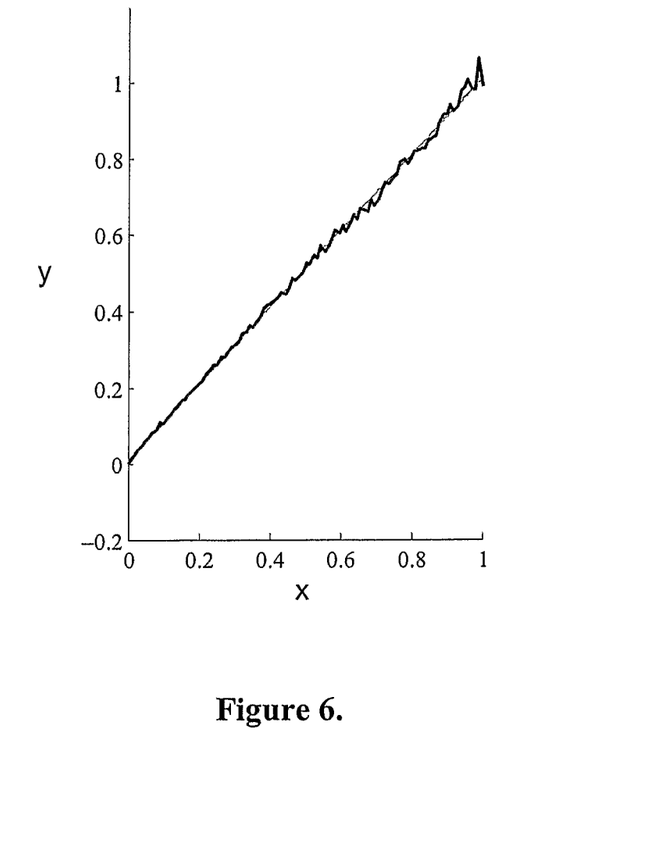
FIG. 6 illustrates the output of a communications channel configured according to a further example of the present invention.

To demonstrate the system, this embodiment was computer simulated with 10,000 sub-channels. The input range was 0.001-1.0, and c was set to unity. FIG. 4 shows the output for an input ramping over the range. As can be seen, the output is a linear function of the input with unity gain, and the noise increases with output signal. FIG. 5 shows the standard deviation of the output against the mean output for input held constant at different levels over the range, and clearly demonstrates Proportional Noise as indicated by the linear regression line.

Illustrative Example 2

A Neuromorphic System

Figure 7:
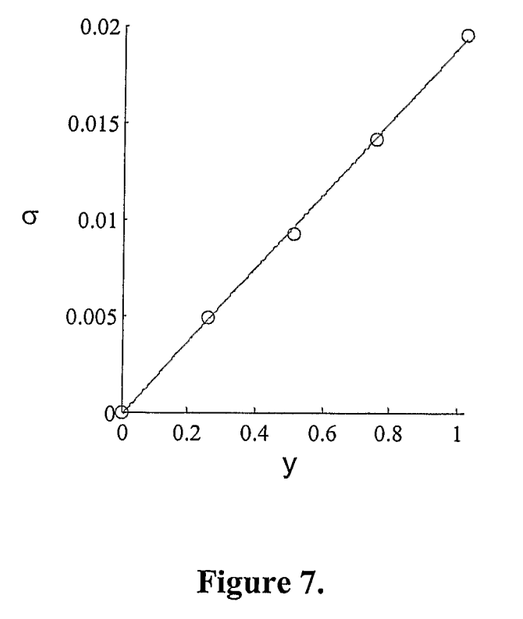
FIG. 7 illustrates the standard deviation of the noise of the communications channel of FIG. 6.

In this further, more complex example the response function and the noise function are not step functions and the example illustrates an artificial neural network. Here each sub-channel represents a neuron whose output is a signal $y_i$ representing firing rate and the neuron output noise $\sigma_{y_{i1}}^2$ is given by a renewal process (such as a Poisson process) where the variance (not the standard deviation) is proportional to the mean output:

$$\sigma_{y_i}^2 = F y_i$$

and F is a constant (often called the 'Fano number'). Based on the analogy to real excitatory neurons, the output firing rate is arranged to increase with the input signal once the threshold has been exceeded, as illustrated in FIG. 2b. If the input does not exceed the threshold, the neuron is switched off and there is no output signal or output noise. In this embodiment the neural response is modelled by:

$$y_i = \begin{bmatrix} A_i - A_i \exp(-\alpha_i(x - \theta_i)) & x_i > \theta_i \\ 0 & x_i \leq \theta_i \end{bmatrix}$$

where $A_i$ is the maximal firing rate of the neuron, and $\alpha_i$ is a rise-time constant, as shown in FIG. 7. The required weights and threshold density function for the system to generate proportional noise. For simplicity it is assumed that all neurons have the same rise-time, $\alpha$, and the same maximal firing rate, A. The recruitment equations (eqs. 5 & 6) thus become:

$$x = \int_0^x w(x') \rho(x') \cdot u(x - x')[A - A\exp(-\alpha(x - x'))] dx' \quad (13)$$

$$k^2 x^2 = F \int_0^x w^2(x') \rho(x') u(x - x')[A - A\exp(-\alpha(x - x'))] dx' \quad (14)$$

These can be solved by taking Laplace transforms. First, define p(x)=w(x)ρ(x) and q(x)=w²(x)ρ(x), then taking Laplace transform of eq 13:

$$\frac{1}{s^2} = P(s)\frac{A\alpha}{s(s+\alpha)} \quad (15)$$

where transforms are shown in upper case, and s is the Laplace variable. Thus:

$$P(s) = \frac{(s+\alpha)}{sA\alpha} = \frac{1}{A\alpha} + \frac{1}{As} \quad (16)$$

so that $$p(x) = w(x)\rho(x) = \frac{1}{A\alpha}\delta(x) + \frac{1}{A}u(x)$$

Similarly, the transform of eq 14 is:

$$\frac{2k^2}{s^3} = Q(s)\frac{A\alpha F}{s(s+\alpha)},$$

and:

$$Q(s) = \frac{2k^2(s+\alpha)}{s^2 AF\alpha} = \frac{2k^2}{AF\alpha s} + \frac{2k^2}{AFs^2}$$

thus $$q(x) = w^2(x)\rho(x) = \frac{2k^2}{AF}(u(x)/\alpha + x).$$

Since w(x)=q(x)/p(x), $$w(x) = \frac{2k^2}{F}(1/\alpha + x), \quad x > 0$$

$$\rho(x) = \frac{F}{2Ak^2}\left(\frac{1}{1/\alpha + x}\right), \quad x > 0$$

At x=0, w(0) and ρ(0) are set to values that approximate the delta function in eq. 16. It is noted that $$p(0) = w(0)\rho(0) = \frac{1}{A\alpha}\delta(0) + \frac{1}{A}, \quad \text{and} \quad q(0) = w^2(0)\rho(0) = \frac{2k^2}{AF\alpha}.$$

This system was computer simulated with 10,000 sub-channels, with the results shown in FIG. 7.

For a small plurality of sub-channels (100's), the continuous equations are not accurate and the discrete equations 1 and 2 require solving. In general this is not possible analytically and numerical methods are required. When the sub-channel properties are specified, the best weights and thresholds can be found by one of many numerical minimisation methods to minimise a suitable loss function, such as least squares:

$$\text{Loss} = \int_0^{x_{max}} \left[ y(x) - \sum_{i=1}^{N} w_i f_i(x - \theta_i) \right]^2 + \lambda \left[ ky^2(x) - \sum_{i=1}^{n} w_i^2 g_i(x - \theta_i) \right]^2 dx$$

where λ is a positive weighting constant.

The applications in which embodiments of the present invention may be applied include various neuromorphic applications. Neuromorphic technology is based on the principles of building machines or systems that have similar performance capabilities to humans and/or animals, that are adaptable and self-organising and that are robust to changing environments. Typical applications of neuromorphic systems are sensory systems, bio robots, neuron modelling, unsupervised learning (self-adapting apparatus or systems) and pattern recognition. Examples of these include silicon retinas, cochleas and prosthetic limbs. Other applications include silicon neurological systems, in which simulated neurons are produced on a silicon chip.

By utilising the communication channel configuration scheme of the present invention within the above mentioned applications, it is expected that the responses and behaviour of the simulated systems and apparatus will more closely follow the actual behaviour of the corresponding systems found in nature, thus improving on the artificial systems.

The invention claimed is:

1. A method of configuring a communication channel prior to the transmission of an input signal along the communication channel, the communication channel comprising a plurality of sub-channels, the method comprising:
    determining the strength of the input signal and in accordance with the determined signal strength, selecting a set of the plurality of sub-channels and
    transmitting said input signal along the set of sub-channels in parallel,
    wherein each of the sub-channels has a predetermined noise characteristic such that the set of selected sub-channels exhibits a combined noise characteristic in which the standard deviation of the noise is directly proportional to the input signal strength.

2. A method according to claim 1, wherein each sub-channel is selected only if the instantaneous input signal strength exceeds an individual threshold value associated with each sub-channel.

3. A method according to claim 1, wherein the noise characteristic of each sub-channel is defined by a gain function associated with each sub-channel and a constant weighting value w, applied to the output of each sub-channel.

4. A method according to claim 3, wherein for a given gain function the threshold value and weighting value for each sub-channel are selected such that the combined noise characteristic of the communication channel exhibits proportional noise.

5. A method according to claim 4, wherein the distribution of the weighting values w(x) and the distribution of sub-channels having a threshold value equal to the instantaneous signal strength ρ(x) is given by solving the equations $$y = x = \int_0^{x_{max}} w(x')\rho(x')y_x(x')dx'$$

and $$\sigma^2 = k^2 x^2 = \int_0^{x_{max}} w^2(x')\rho(x')y_x(x')dx'$$

where y is the instantaneous combined output signal value, σ is standard deviation of the noise function and k is a constant of proportionality.

6. A method according to claim 5, wherein the equations are solved by numerical methods.

7. A method according to claim 4, wherein the threshold values and weighting values are selected by solving the equations $$y(x) = \sum_{i=1}^{N} w_i f_i(x - \theta_i)$$

and $$\sigma_y^2(x) = \sum_{i=1}^{N} w_i^2 g_i(x - \theta_i)$$

where $\theta_i$ is the threshold value for the ith sub-channel.

8. A method according to claim 3, wherein the gain function for each sub-channel comprises a step function, the input signal has a minimum instantaneous value ε and the total number N of sub-channels is determined according to the equation $$N = \int_{\varepsilon}^{x_{max}} \rho(x) dx,$$

wherein ρ(x) is an instantaneous signal strength.

9. A method according to claim 3, wherein each sub-channel is arranged to simulate a neuron within a neural network such that the distribution of weighting values w(x) and the distribution of sub-channels having a threshold value equal to the instantaneous signal strength ρ(x) is given by solving the equations $$w(x) = \frac{2k^2}{F}(1/\alpha + x)$$

and $$\rho(x) = \frac{F}{2Ak^2}\left(\frac{1}{1/\alpha + x}\right)$$

for x>0, where k is a constant, F is the Fano number for the sub-channel renewal process, α is a rise-time constant for the simulated neurons and A is the maximal firing rate for the simulated neurons.

10. A neuromorphic system adapted to carry out the method of claim 1.

11. A processor adapted to execute the method of claim 1.

12. Apparatus for configuring a communication channel comprising a plurality of sub-channels, each sub-channel having a threshold switch arranged to receive an input signal having an instantaneous signal value and to connect the sub-channel to the input signal only if the instantaneous signal value exceeds a predetermined threshold value, the apparatus further comprising:

a summator arranged to receive the output of each sub-channel and combine said outputs to provided a combined output signal, wherein each sub-channel has a predetermined noise characteristic such that the connected sub-channels exhibit a combined noise characteristic in which the standard deviation of the noise is directly proportional to the input signal strength.

13. Apparatus according to claim 12, wherein each sub-channel includes a constant gain unit arranged to apply a constant weighting value $w_i$ to the output of each sub-channel prior to the output being provided to the summator and each sub-channel has a further gain function associated with it, such that the noise characteristic of each sub-channel is defined by said gain function and said constant weighting value $w_i$.

14. Apparatus according to claim 13, wherein the distribution of the weighting values w(x) and the distribution of sub-channels having a threshold value equal to the instantaneous signal strength ρ(x) is given by solving the equations $$y = x = \int_{0}^{x_{max}} w(x')\rho(x')y_x(x')dx'$$

and $$\sigma^2 = k^2 x^2 = \int_{0}^{x_{max}} w^2(w')\rho(x')y_x(x')dx'$$

where y is the instantaneous combined output signal value, σ is standard deviation of the noise function and k is a constant of proportionality.

15. Apparatus according to claim 13, wherein the threshold values and weighting values are given by the equations $$y(x) = \sum_{i=1}^{N} w_i f_i(x - \theta_i)$$

and $$\sigma_y^2(x) = \sum_{i=1}^{N} w_i^2 g_i(x - \theta_i)$$

where $\theta_i$ is the threshold value for the ith sub-channel.

16. Apparatus according to claim 13, wherein the gain function for each sub-channel comprises a step function, the input signal has a minimum instantaneous value ε and the total number N of sub-channels is determined according to the equation $$N = \int_{\varepsilon}^{x_{max}} \rho(x) dx,$$

wherein ρ(x) is an instantaneous signal strength.

17. Apparatus according to claim 13, wherein each sub-channel is arranged to simulate a neuron within a neural network such that the distribution of weighting values w(x) and the distribution of sub-channels having a threshold value equal to the instantaneous signal strength ρ(x) is given by solving the equations $$w(x) = \frac{2k^2}{F}(1/\alpha + x)$$

and $$\rho(x) = \frac{F}{2Ak^2}\left(\frac{1}{1/\alpha + x}\right)$$

for x>0, where k is a constant, F is the Fano number for the sub-channel renewal process, $\alpha$ is a rise-time constant for the simulated neurons and A is the maximal firing rate for the simulated neurons.

18. A computer-readable medium having computer-executable instructions stored in a computer-readable memory for implementing a method of configuring a communication channel prior to the transmission of an input signal along the communication channel, the communication channel comprising a plurality of sub-channels, the method comprising:

determining, on a computer, the strength of the input signal and in accordance with the determined signal strength, selecting, on a computer, a set of the plurality of sub-channels and transmitting, by a computer, said input signal along the set of sub-channels in parallel, wherein each of the sub-channels has a predetermined noise characteristic such that the set of selected sub-channels exhibits a combined noise characteristic in which the standard deviation of the noise is directly proportional to the input signal strength.

* * * * *

UNITED STATES PATENT AND TRADEMARK OFFICE
CERTIFICATE OF CORRECTION

PATENT NO. : 8,438,123 B2
APPLICATION NO. : 12/064222
DATED : May 7, 2013
INVENTOR(S) : Harris It is certified that error appears in the above-identified patent and that said Letters Patent is hereby corrected as shown below:

In the Claims

In Column 10, Line 21, in Claim 14, delete " $\sigma^2 = k^2 x^2 = \int_0^{x_{max}} w^2(w')\rho(x')y_x(x')dx'$ " and insert -- $\sigma^2 = k^2 x^2 = \int_0^{x_{max}} w^2(x')\rho(x')y_x(x')dx'$ --, therefor.

Signed and Sealed this
Fourteenth Day of April, 2015

Michelle K. Lee
*Director of the United States Patent and Trademark Office*

UNITED STATES PATENT AND TRADEMARK OFFICE
CERTIFICATE OF CORRECTION

PATENT NO.        : 8,438,123 B2  
APPLICATION NO.   : 12/064222  
DATED             : May 7, 2013  
INVENTOR(S)       : Christopher Harris Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1330 days.

Signed and Sealed this
Eighth Day of September, 2015

Michelle K. Lee
*Director of the United States Patent and Trademark Office*